(12) United States Patent
Svirklys et al.

(10) Patent No.: US 6,932,540 B2
(45) Date of Patent: Aug. 23, 2005

(54) PERMEABLE WATER RESERVOIR COVERS

(75) Inventors: Fred Svirklys, Ontario (CA); Dennis Shanklin, Ladson, SC (US)

(73) Assignee: 3-R Foam, Inc., Gaston, SC (US)

( * ) Notice: Subject to any disclaimer, the term of this patent is extended or adjusted under 35 U.S.C. 154(b) by 0 days.

(21) Appl. No.: 10/384,935

(22) Filed: Mar. 10, 2003

(65) Prior Publication Data

US 2003/0222016 A1 Dec. 4, 2003

Related U.S. Application Data

(63) Continuation-in-part of application No. 09/972,680, filed on Oct. 8, 2001, now Pat. No. 6,558,548.
(60) Provisional application No. 60/238,818, filed on Oct. 6, 2000.

(51) Int. Cl.$^7$ .............................. C02F 3/00; B01D 53/85
(52) U.S. Cl. ..................... 405/52; 442/375; 442/227; 405/63
(58) Field of Search ................ 405/52, 53, 63, 405/70, 71; 210/603, 615, 150, 188, 916; 55/512, 514; 95/273; 442/30, 56, 221, 226, 227, 315, 370, 374, 375

(56) References Cited

U.S. PATENT DOCUMENTS

| | | | |
|---|---|---|---|
| 2,796,399 A | 6/1957 | Sanders et al. | |
| 2,835,313 A | * 5/1958 | Dodge | 5/740 |
| 3,113,924 A | 12/1963 | Mendius, Jr. | |
| 3,517,513 A | * 6/1970 | Trippe et al. | 405/52 |
| 3,726,624 A | 4/1973 | Schwarz | 425/145 |
| 3,815,367 A | * 6/1974 | Collins et al. | 405/52 |
| 4,066,400 A | 1/1978 | Cox et al. | |
| 4,165,281 A | 8/1979 | Kuriyama et al. | |
| 4,169,050 A | 9/1979 | Serfling et al. | |
| 4,201,663 A | 5/1980 | Rollag et al. | |
| 4,287,163 A | * 9/1981 | Garrett et al. | 423/283 |
| 4,672,691 A | 6/1987 | De Garie et al. | |
| 4,806,148 A | 2/1989 | Ottengraf | |
| 4,862,539 A | * 9/1989 | Bokich | 428/71 |
| 5,049,265 A | 9/1991 | Boyd et al. | |
| 5,067,182 A | * 11/1991 | Koelsch | 4/498 |
| 5,106,496 A | 4/1992 | Cournoyer et al. | |
| 5,228,998 A | 7/1993 | DiClemente et al. | |
| 5,232,586 A | 8/1993 | Malone | |
| 5,232,676 A | 8/1993 | Wolff et al. | |
| 5,400,549 A | 3/1995 | Morgan | |
| 5,431,808 A | 7/1995 | Zumbrogel | |
| 5,480,538 A | 1/1996 | McCombs et al. | |
| 5,486,292 A | 1/1996 | Bair et al. | |
| 5,562,759 A | 10/1996 | Morgan et al. | |
| 5,580,770 A | 12/1996 | DeFilippi | |
| 5,700,687 A | 12/1997 | Finn | |
| 5,714,379 A | 2/1998 | Phipps, Jr. | |
| 5,861,095 A | 1/1999 | Vogel et al. | |
| 5,962,309 A | 10/1999 | Kumagai et al. | |
| 5,980,738 A | 11/1999 | Heitkamp et al. | |
| 6,022,476 A | 2/2000 | Hausin | |
| 6,069,003 A | 5/2000 | Ahlqvist | |
| 6,086,755 A | 7/2000 | Tepper | |
| 6,087,159 A | 7/2000 | Finn | |
| 6,136,194 A | 10/2000 | Vogel et al. | |
| 6,558,548 B2 | * 5/2003 | Svirklys et al. | 210/603 |

FOREIGN PATENT DOCUMENTS

| | | |
|---|---|---|
| DE | 34 28 798 A | 8/1985 |
| DE | 44 40 464 C | 6/1996 |
| DE | 197 27 275 A | 1/1999 |

* cited by examiner

*Primary Examiner*—John Kreck
(74) *Attorney, Agent, or Firm*—Alston & Bird LLP (57) ABSTRACT

Potable and process water reservoir covers are provided that exhibit an advantageous balance of rainwater drainage and light transmittance properties. The reservoir covers generally include one or more floatation panels formed from bonded foam particles that are adhered to a fabric layer. The present invention provides a reliable, cost-effective means by which to decrease the algae growth generally associated with water reservoirs. The present invention further decreases reservoir contamination issues associated with dust, sand, debris and waterfowl.

36 Claims, 5 Drawing Sheets

PERMEABLE WATER RESERVOIR COVERS

CROSS-REFERENCE TO RELATED APPLICATIONS

This application is a continuation-in-part of U.S. patent application Ser. No. 09/972,680, filed Oct. 8, 2001, now U.S. Pat. No. 6,558,548 which claims priority from U.S. Provisional Application Ser. No. 60/238,818, filed Oct. 6, 2000, under 35 U.S.C. § 119(c), both of which are hereby incorporated herein in their entirety by reference.

FIELD OF THE INVENTION

This invention generally relates to water reservoirs. More specifically, the present invention relates to covers used in conjunction with water reservoirs and other liquid containment means. The invention further relates to methods by which to use and produce such covers.

BACKGROUND OF THE INVENTION

Vast quantities of water are consumed daily. Exemplary uses for water include human consumption (i.e. potable water), industrial processes and agriculture, among others. Water is particularly well known as a cooling fluid for a wide variety of industrial processes, such as heat exchangers, cooling towers, and the like.

Due to the cyclical nature of water consumption, large volumes of water are typically stored in massive containment means, such as reservoirs. Reservoirs are particularly well known in conjunction with potable and/or process water. Reservoirs are generally open-air structures that provide a high amount of surface area. Suitable reservoir configurations include tanks, ponds, lakes and the like.

Unfortunately, the high surface area provided by traditional reservoirs generally allows sunlight to filter down into and through the depths of the water contained therein. The presence of sunlight within the depths of the water is problematic because reservoirs are further typically rich in nutrients. More specifically, the combination of available sunlight and nutrient levels within reservoir water is usually sufficient to sustain bio-matter, such as algae, duckweed, and the like. Bio-matter is undesirable because it readily fouls downstream equipment, such as downstream purification or process equipment. In addition to bio-matter issues, reservoirs suffer the additional detriment of significant evaporative losses and contamination by dust, sand, leaves and other organic matter.

Many reservoirs utilize impermeable covers to encapsulate the reservoir surfaces, thereby blocking sunlight from entering the reservoir and diminishing evaporative losses. Impermeable covers are typically formed from polymeric film, such as a polyethylene membrane, suspended above the reservoir. However, such impermeable covers are expensive, require substantial support equipment, involve time consuming and costly maintenance, and are vulnerable to puncture, weather, vandalism, fatigue, and deterioration. The suspension of impermeable covers above the surfaces of large bodies of water, such as reservoirs, is further difficult. By definition, impermeable reservoir covers further require a drainage system to channel away rainwater. Consequently, impermeable reservoir covers are problematic in that they may become submersed by rainwater if the drainage system becomes inoperable or is otherwise poorly designed.

Thus there remains a need in the art for reservoir covers providing a beneficial balance of liquid transport, i.e. rain drainage, and which further diminish the bio-mass within the reservoir, e.g. by obstructing sunlight from entering the reservoir. There further remains a need in the art for reservoir covers that are durable, economical and easily installed.

SUMMARY OF THE INVENTION

The present invention provides reservoir covers exhibiting a beneficial balance of opacity and liquid transport. By blocking sunlight the reservoir covers of the invention can diminish or eliminate bio-matter present within the depths of the reservoir water. Surprisingly, although preferably highly opaque, the reservoir covers of the invention nevertheless allow rainwater to readily pass through, thereby avoiding inundation during storms and the like. Reservoir covers in accordance with the invention also help prevent debris, such as leaves, from entering the water. The reservoir covers of the invention are further durable, economical and easily installed.

The reservoir covers of the invention are generally formed from one or more floatation panels joined by a fabric layer. The floatation panels include a plurality of polymeric foam particles arranged in a piled laminate structure, the piled laminate structure defining a first face and an opposing second face. At least a portion of the polymeric foam particles within the piled laminate structure are bonded to at least one adjoining foam particle positioned either above or below the foam particle, and the foam particles are arranged within the piled laminate structure so as to define interstices between at least a portion of said foam particles. The interstices within the piled laminate structure are of sufficient size and quantity to allow rainwater to flow through while further providing a light transmittance of less than about 95%. In preferred embodiments of the invention, the interstices within the piled laminate structure are of sufficient size and quantity to provide floatation panels exhibiting a light transmittance of less than about 5%, such as a light transmittance of less than about 1%.

Exemplary materials from which to form the polymeric foam particles include one or more polymers selected from polyolefin, polyvinyl acetate, and polyurethane. Advantageously, the polymeric foam particles have a diameter in the range of from about 0.25 to 3.0 inches. The polymeric foam particles can be bonded by any means, including thermal bonding, needlepunching, stitching and chemically binding. Advantageously, the polymeric foam particles are thermally bonded.

Floatation panels in accordance with the invention may be relatively thin. For example, the floatation panel may have a thickness between the first and second face that ranges from about 7 to 250 mm. In particularly advantageous embodiments, the floatation panel may have a thickness ranging from about 10 to 40 mm, such as a thickness of about 20 to 28 mm. The floatation panels are further relatively dense. For example, the floatation panels of the invention typically exhibit a density ranging from about 1.5 to 20 $lb/ft^3$, such as a density ranging from about 10 to 16 $lb/ft^3$, particularly from about 12 to 15.5 $lb/ft^3$. Although relatively dense, the floatation panels remain quite buoyant. Floatation panels of the invention typically exhibit buoyancies of from about 40 to 60 $lb/ft^3$.

As noted above, the reservoir covers are generally formed from two or more floatation panels joined using a fabric layer bonded to at least a portion of the first face. The fabric layer can be formed from one or more fibers selected from polyester, nylon, glass, acrylic, flax, and polyolefin. The fabric layer is advantageously formed from fiber having a denier ranging from about 3 to 45. The fabric layer may have any construction. In beneficial embodiments the fabric layer is a nonwoven fabric. Exemplary fabric layer weights typically range from about 3 oz/yd$^2$ to 50 oz/yd$^2$. In advantageous embodiments, the floatation panel includes a second fabric bonded to at least a portion of the second face.

The invention further includes water reservoir systems including the beneficial water reservoir covers of the invention. The water reservoir system generally includes a reservoir containing water and a reservoir cover spanning the surface of the reservoir. The water reservoir system can further include an anchor to secure the reservoir cover around the perimeter of the reservoir. In beneficial aspects of the invention, the reservoir cover may be secured to a floating baffle to form two or more separate water storage areas within the reservoir. In such beneficial aspects, one or more reservoir covers may span the surface of one or more of the water storage areas.

The present invention also encompasses methods of supplying potable or process water, which generally include supplying potable or process water to a reservoir; covering the surface of the reservoir with a permeable water reservoir cover; providing an anchor around the perimeter of the reservoir; and securing the reservoir cover with an anchor.

DETAILED DESCRIPTION OF THE INVENTION

The present invention now will now be described more fully hereinafter with reference to the accompanying drawings, in which advantageous embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
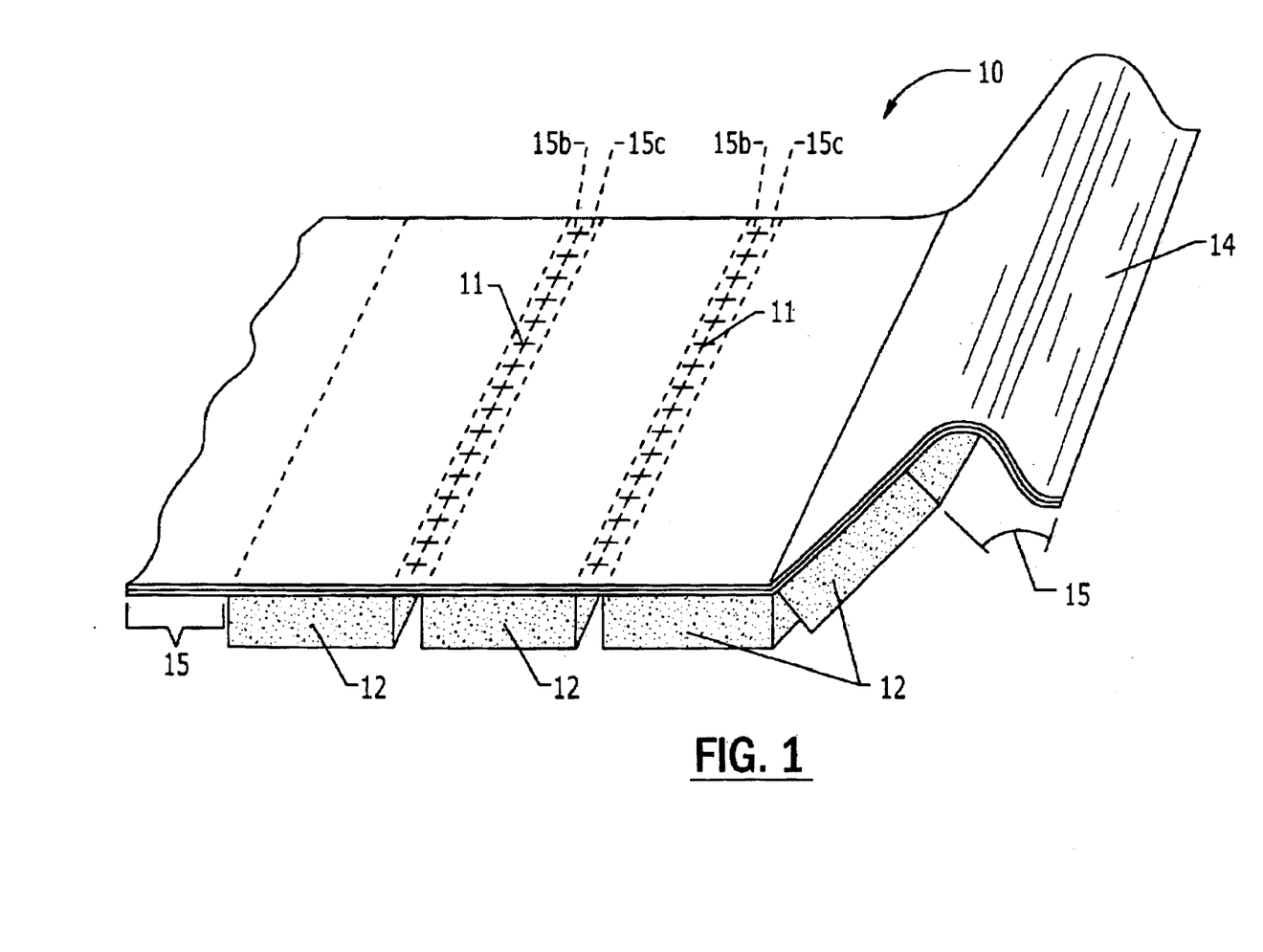
FIG. 1 illustrates a schematic top perspective view of one advantageous embodiment of the reservoir cover of the present invention.

Referring now to FIG. 1, a schematic representation of a reservoir cover in accordance with advantageous embodiments of the present invention is provided. The reservoir cover 10 (hereinafter referred to simply as the "cover ") is generally formed from at least one floatation panel 12 joined to a fabric layer 14.

Figure 2:
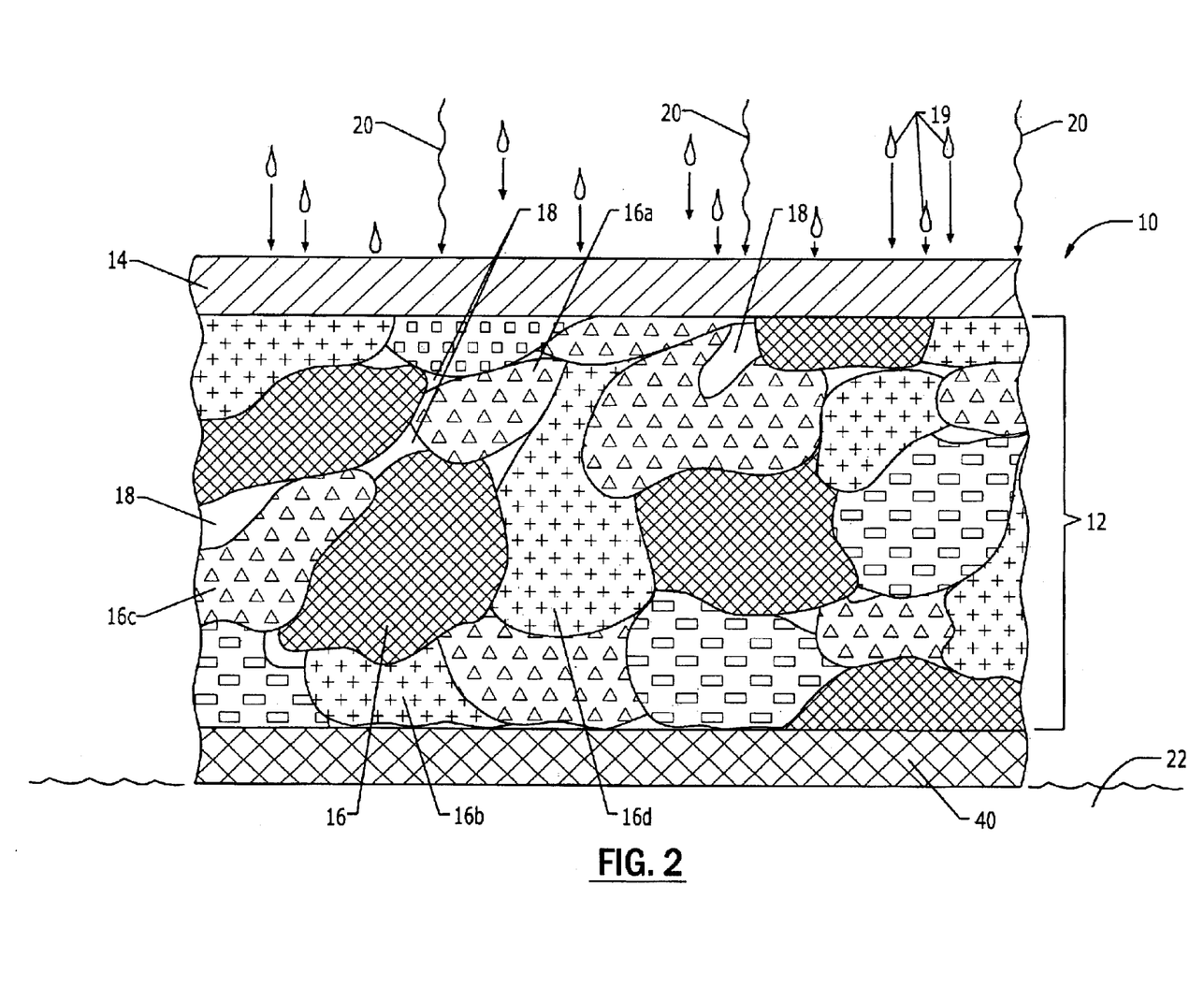
FIG. 2 illustrates a greatly enlarged schematic cross sectional view of one embodiment of the reservoir cover of the present invention.

FIG. 2 provides a grossly enlarged cross sectional view of a section of an exemplary cover 10 suitable for use in the present invention. In general, the floatation panel 12 portion of the cover 10 is formed from foam particles 16 of various sizes, shapes and densities that have been bonded together to provide a cohesive structure. Further, the foam particles 16 forming the floatation panel 12 are typically randomly arranged into a piled laminate structure.

The foam particles 16 that form the floatation panel 12 generally range in size from about 0.10 to 3.0 inches. The foam particles 16 that form the floatation panel 12 preferably range in size from about 0.25 to 3.0 inches. In one beneficial embodiment, the foam particles 16 have an average diameter of about 1.0 inch. As used herein, the "particle size" refers to the average diameter of the foam particles 16 determined at ambient conditions, i.e. at atmospheric pressure and room temperature, prior to their incorporation into the floatation panel 12. The foam particles 16 may have any shape, and in advantageous embodiments a variety of shaped foam particles 16 are included in the floatation panel 12.

Any suitable polymeric foam can be shredded or chopped to form the foam particles 16. Exemplary foams include any thermoplastic, thermoset or engineered foam. Suitable foams for use in the invention include polyolefin foams, including polyethylene and polypropylene foams, ethylene vinyl acetate foam, and polyurethane foam. As used herein, the term "polyethylene" encompasses low density, linear low density, and high density polyethylene. A majority of the polymeric foam particles 16 should be formed from closed cell foams to provide sufficient buoyancy. Advantageously, from 90% to 100% of the polymeric foam particles 16 are formed from closed cell foam. In one particularly advantageous embodiment closed cell foam formed from polyethylene is employed.

The foam particles 16 can further be formed from cross-linked foam to enhance its strength, chemical resistance, weather resistance and durability. Advantageously, from about 50 to 100% of the polymeric foam particles 16 are cross-linked, such as amounts ranging from about 90 to 100%. In one advantageous aspect of the invention, the foam particles 16 are formed from cross-linked polyethylene foam. In a further beneficial embodiment, the foam particles 16 are formed from cross-linked closed cell polyethylene foam. The foam particles may further be formed from recycled polymer, such as closed cell recycled polyethylene foam.

An exemplary polyethylene foam construction for use as a floatation panel 12 of the present invention is available commercially from 3R-Foam, Inc. of Gaston, S.C. and Sirex Engineering of Mississauga, Ontario Canada as 3RD50™, 3RD35™, 3RD25™, and 3RD15ACPET™ foams.

The foam particles 16 within the floatation panel 12 are bonded together to provide a cohesive structure. More particularly, the floatation panel 12 is advantageously durable, e.g. able to withstand the elements, such as rain, snow, hail and the like. To provide a cohesive structure, at least a portion of the foam particles 16 within the floatation panel 12 are bonded to at least one adjoining foam particle positioned either above or below them, as illustrated in FIG. 2 as 16a and 16b, respectively. At least a portion of the foam particles 16 within the floatation panel 12 are also bonded to at least one adjoining foam particle positioned beside them, as further illustrated in FIG. 1 as 16c and 16d, respectively. In beneficial embodiments, substantially all of the foam particles 16 within the floatation panel 12 are bonded to at least one adjoining foam particle positioned either above, below or beside them, as further illustrated in FIG. 1 as 16a through 16d, respectively.

However, although at least a portion of the individual foam particles 16 are bonded together, sufficient void spaces 18 are present between the foam particles 16 to ensure that the floatation panel 12 provides suitable liquid transport, i.e. the rainwater 19 striking the surface of the floatation panel 12 is transported through the thickness of the panel to the reservoir water 22 at an adequate rate. Stated differently, sufficient void spaces 18 remain between at least a portion the foam particles 16 to avoid inundation of the cover 10 during rainstorms and the like. To provide adequate liquid transport properties to the cover 10, the floatation panels 12 typically exhibit a water permeability of greater than $1.2 \times 10^{-1}$ m/s in the vertical direction.

Although allowing liquids (such as rainwater 19 and the like) to pass through, the void spaces 18 within the floatation panel 12 are advantageously of a quantity and/or size to block an effective amount, preferably a majority, of the sunlight 20 striking the surface of the cover 10 from entering the reservoir water 22. Consequently, the amount and size of the void spaces 18 included within the floatation panel 12 is typically minimized, e.g. the floatation panel 12 preferably includes approximately the minimum amount and size of void spaces 18 required to provide adequate liquid transport.

Surprisingly, Applicants have found that by including a lesser amount and/or smaller sized void spaces 18 within the floatation panel 12, covers 10 can be formed which block substantially all of the sunlight 20 from passing through their thickness, yet allow rainwater 19 to readily to pass through. The ability to block substantially all of the light impinging the surface of the cover is particularly surprising in view of the fact that the floatation panel is formed from an aggregate of porous material, i.e. porous foam particles.

In advantageous embodiments, the floatation panel transmits less than about 5% of the light striking its surface. Preferably, the floatation panel transmits less than about 1% of the light striking its surface. Stated differently, the floatation panels advantageously provide an opacity greater than about 95%, such as an opacity of greater than about 99%, preferably an opacity of greater than about 99.988%. By blocking the transmission of substantially all of the sunlight 20 impinging on its surface, the cover 10 decreases or eliminates the growth and sustenance of biomass within the reservoir water 22, such as algae and duckweed. Although not wishing to be bound by theory, Applicants hypothesize that floatation panels transmitting even greater amounts of light, such as light transmissions of up to 95%, may also detrimentally affect any biomass present within the reservoir water. Covers exhibiting light transmission values of up to 95% would further help prevent debris from entering the reservoir water.

Buoyancy is one indication of the quantity and size of the void spaces present within the floatation panel, with higher buoyancies indicating lesser amounts of and/or smaller void spaces. Applicants have found that floatation panels characterized by area buoyancies capable of supporting from about to 1.5 to 6 lb/ft$^2$, such as area buoyancies ranging from about 2.5 to 5.0 lb/ft$^2$, preferably from about 2.8 to 3.8 lb/ft$^2$, provide an advantageous balance of opacity and liquid transport. These area buoyancies translate on a per volume basis (either on a bulk volume or displaced volume basis) to volume buoyancies ranging from about 35 to 60 lb/ft$^3$, such as volume buoyancies ranging from about 40 to 60 lb/ft$^3$, preferably from about 40 to 55 lb/ft$^3$.

The covers 10 of the invention thus float on the surface of the reservoir water 22, and hence do not require a separate support system. To ensure sufficient buoyancy, at least a portion of the foam particles 16 forming the floatation panels 12 have a density less than water, i.e. less than 1.0 g/cc. More particularly, at least a portion of the foam particles 16 exhibit a sufficient density to enable the foam particles 16 to collectively float the floatation panel 12 and provide sufficient buoyancy. The covers 10 of the invention generally range in density from about 1.5 to 20.0 lb/ft$^3$, such as from about 2.5 to 18.0 lb/ft$^3$, preferably from about 4.0 to 46.0 lb/ft$^3$.

As indicated in FIG. 2, the cover 10 further includes a fabric layer 14. The fabric layer 14 is typically adhered to the floatation panel 12 on the surface opposing the reservoir water 22, and is generally employed to bond two or more floatation panels 12 into a unitary structure.

The fabric layer 14 may be formed from any suitable fabric construction. Exemplary fabric constructions include nonwoven, woven, knit and net constructions. In one beneficial embodiment, the fabric layer 14 can be formed from nonwoven fabric, particularly spunbond nonwoven fabric. The fabric layer 14 can advantageously range in weight from about 3 to 50 oz/yd$^2$.

The fabric layer 14 is also advantageously durable, e.g. able to withstand the elements, such as sunlight, rain, snow, hail and the like. Further, the fabric layer 14 should also have a permeability and diffusivity sufficient to allow rainwater 19 to pass through. The fabric layer 14 should also provide a sufficient amount of flexibility, to allow sections of the cover 10 to be folded back on itself if desired, such as during installation or removal. The fabric layer 14 further typically exhibits both a puncture strength of at least 150 pounds as measured via ASTMD 4833 and a trap tear strength of at least 65 pounds, as measured via ASTM D4533.

In an alternate beneficial embodiment, the fabric layer 14 is a needle-punched nonwoven fabric. The needle-punched fabric can optionally include a weather resistant scrim 28, into which weather resistant synthetic fiber has been secured. The scrim may be formed from any suitable material, including polyester, nylon, glass fiber, acrylic, flax, polyolefin, and mixtures thereof. Polyolefin scrims include polyethylene and polypropylene scrims.

The fabric layer 14 may be formed from any weather resistant synthetic or natural fiber. Exemplary fibers from which to form the fabric layer 14 include polyester, nylon, acrylic, flax, polyolefin, including polypropylene, and polyethylene, glass fiber or any other melt spinnable fiber, and mixtures thereof. In one advantageous embodiment, the fabric layer 14 is formed from polyester fiber, particularly UV resistant polyester such as polyester that has been filled with carbon black. In a further advantageous embodiment, the fabric layer 14 is formed from acrylic fiber, either alone or in conjunction with polyester or other fiber.

The fabric layer 14 may further be formed from either staple or continuous filament fiber. In beneficial embodiments, the fabric layer 14 is formed from fiber having a denier ranging from about 3 to 45 denier. The overall fabric layer 14 weight generally ranges from about 5 to 35 oz/yd$^2$, such as a fabric weight ranging from about 7 to 10 oz/yd$^2$, most preferably about 7 oz/yd$^2$. The fabric layer 14 may further be coated with a UV resistant coating, such as an acrylic coating.

Optionally, the flotation panel may include a textile layer 40, generally positioned between the foam particles 16 and the reservoir water 22 following installation. The textile layer 40 can be formed from any textile construction, including nonwoven, woven, net and knit fabrics. In advantageous embodiments the textile layer 40 is a nonwoven fabric. In one advantageous aspect of that embodiment, the textile layer 40 is a felt-like nonwoven fabric. The textile layer 40 may be formed from any environmentally resistant fiber, including polyester, nylon, glass fiber, acrylic, flax, polyolefin, including polypropylene, polyethylene, and the like. The textile layer 40 may be of any suitable fabric weight, and is advantageously a lightweight fabric.

The floatation panel 12 may be formed by bonding the foam particles 16 together using a variety of techniques, including thermal bonding, needle punching, stitching, adhesives (also referred to as "chemically binding"), ultrasonic bonding, UV curing and the like.

In one advantageous embodiment, the foam particles 16 within the floatation panel 12 may be thermally bonded using a pair of platens supplying heated air, for example super heated air. In this advantageous embodiment, a layer of foam particles is piled in a random manner atop a first platen. The surface of the first platen supporting the layer of foam provides an array of holes to transport heated air into the layer of foam particles 16. In advantageous embodiments, the fabric layer 14 described above is placed between the first platen and the foam particles 16 prior to heating. In such advantageous embodiments, the fabric layer 14 is thermally bonded to the floatation panel 12 during the floatation panel 12 manufacturing process. To complete the floatation panel 12, a second platen, similarly defining an array of holes suitable to transport heated air, is then brought into contact with the opposing surface of the layer of foam particles.

A sufficient amount of heated air is subsequently introduced through the platens to soften and bond the foam particles. The heated air is provided at a temperature suitable to soften the surface of the foam particles without inducing degradation. The top platen further applies sufficient pressure to the foam particles during the bonding process to produce the desired foam density, particularly the desired immersion density.

In an alternative embodiment, textile materials may be bonded to both the top and the bottom of the floatation panel 12. More specifically, a second layer of textile material 40, such as a woven, nonwoven, knit or net fabric, may be placed between the second platen and the foam particles 16 prior to heating and similarly thermally bonded to the floatation panel 12.

In a further alternative advantageous embodiment, at least a portion of the foam particles 16 are bonded using stitching or needlepunching. For example, foam particles can be piled in a random manner atop a first textile material, such as a nonwoven fabric. A second textile material, for example a second nonwoven fabric, may then be positioned over the top of the layer of foam particles. Exemplary fabric weights for the first and second textile material may range from about 4 to 35 oz/yd$^2$. Conventional needlepunch equipment, such as a two bed needlepunch commonly used in the production of nonwoven fabric, may then be employed to bind the foam particles and fabric into a cohesive structure. Yarns or filaments may further be inserted through the thickness of the layer of foam particles and the textile materials during the needlepunch process. Suitable textile materials for use in these aspects may be formed from any environmentally resistant fiber. Similarly, the inserted yarns or filaments may be formed from any environmentally resistant fiber. Exemplary environmentally resistant fibers include polyester, nylon, acrylic, flax, polyolefin, including polypropylene and polyethylene, and glass fiber or any other melt spinnable fiber, and mixtures thereof. Polyester may also advantageously be employed, particularly UV resistant polyester, such as carbon black filled polyester.

The floatation panels 12 may be provided in any suitable shape. In one beneficial embodiment, the floatation panels are rectangular in shape, such as an approximately 39 inches wide by 88 inches long rectangle. Alternatively, the floatation panel 12 may be provided as a wide web roll good, such as a roll ranging from about 24 to 100 inches, particular from about 48 to 96 inches. In such advantageous aspects, the roll goods may have any length known in the art of wide web goods, such as a length ranging from about 40 to 300 feet, particularly from about 50 to 200 feet. The fabric layer 14 may further be advantageously bonded to the floatation panel 12 during floatation panel manufacture in such roll goods aspects.

The floatation panels 12 suitable for use in the present invention typically range in thickness from about 7 to 250 mm, such as from about 10 to 40 mm. In advantageous embodiments, the floatation panel 12 is approximately 20 to 28 mm thick.

The floatation panels 12 typically exhibit a tensile strength of greater than about 9 k/nm. The floatation panels 12 further generally exhibit an ultimate elongation of about 575%, a compressive creep at a dynamic load of 1,235 lb/ft$^2$ of about −25% and a surface hardness ranging from about 20 to 40 shore A, such as a surface hardness ranging from about 30 to 40 Shore A.

Returning now to FIG. 1, the covers 10 are generally formed by bonding two or more floatation panels 12 together via their respective fabric layers 14. Consequently, to facilitate bonding, the fabric layer 14 typically includes an overhang 15, which extends past at least a portion of the perimeter of the floatation panel 12. For example, the overhang 15 is advantageously present along the entire length of the longest perimeters (i.e. the machine direction edges) of the floatation panel 12, particularly in embodiments in which the floatation panel 12 is supplied in roll good form. The overhang 15 may have any convenient width, such as a width of ranging from about 4 to 24 inches. In beneficial embodiments, the floatation panel has overhang of about 6 inches or more.

As shown in FIG. 1, the floatation panels are typically joined by sewing or otherwise bonding (as indicated by the crossed lines 11) the overhangs of two adjacent floatation panels, shown as 15b and 15c, respectively. Any suitable durable, weather resistant thread may be used to sew the overhangs 15b and 15c of adjacent floatation panels. Exemplary durable, weather resistant threads include threads formed from extended chain polyethylene, polytethfluoroethylene, and the like. Thread formed from extended chain polyethylene is commercially available from JHRC, LLC as Supreme Protector Thread.

Upon being joined 11 at their overhangs 15b and 15c, the fabric layers 14 provide stability and cohesion to the floatation panels 12 that make up the cover 10. Any number of floatation panels 12 may be joined to form the cover 10. In the advantageous embodiment provided in FIG. 4, the cover 10 is formed by joining four floatation panels 12. However, the requisite number of floatation panels 12 included within the cover 10 is determined by the size of the reservoir and dimensions of the floatation panels.

The reservoir covers of the present invention are suitable for use on a variety of reservoir configurations. The reservoir may contain water for any application, including animal, human or plant consumption or industrial process water. The reservoir may further have any configuration known in the art, including lagoons, ponds, tanks, concrete cells or other holding vessels.

Among their many beneficial attributes, the covers 10 of the present invention are generally highly buoyant. For example, the covers 10 generally exhibit area buoyancies ranging from about 1.5 to 6.0 lb/ft$^2$, such as area buoyancies ranging from about 2.0 to 4.0 lb/ft$^2$, preferably about 2.5 to 4 lb/ft². The covers 10 are further puncture and generally wind resistant, i.e., the covers 10 do not shift or substantially move in response to wind sweeping across the reservoir surface.

Figure 3:
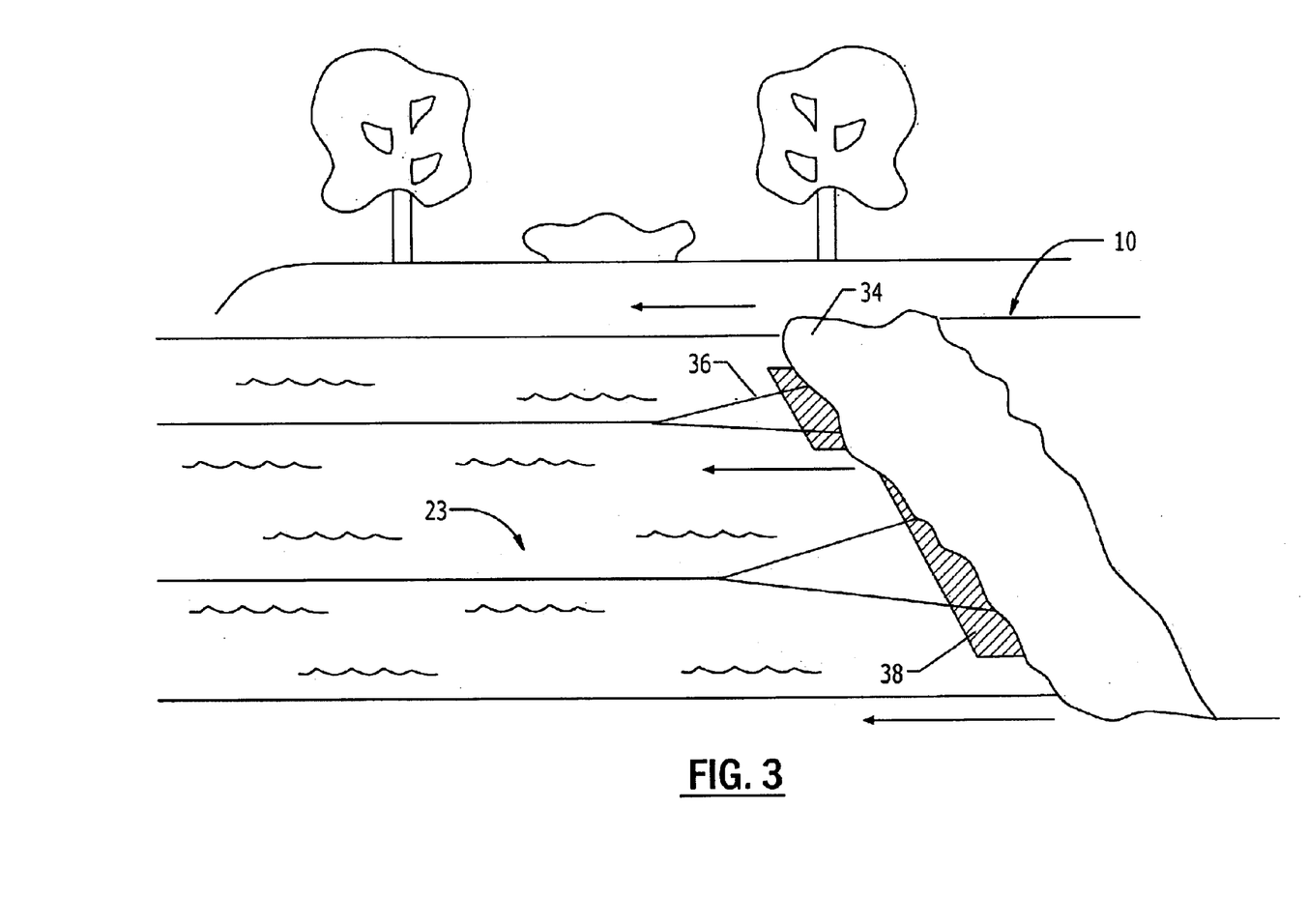
FIG. 3 illustrates a schematic view of a reservoir cover of the present invention being positioned over a reservoir.

FIG. 3 depicts the installation of a cover 10 formed in accordance with the present invention. For the sake of illustration, the cover 10 is shown being installed on a reservoir 23. Prior to installation, the cover 10 is partially assembled at the edge of the reservoir 23, for example by sewing the overhang of adjacent floatation panels together, and the partially assembled section is then drug across the surface of the reservoir 23. A sheet of plastic film or the like may initially be spread out at the bank of the reservoir 23 to provide a clean workspace for assembling the cover 10.

The floatation panels 12 can be bonded to the fabric layers 14 using any suitable technique. As noted previously, the fabric layer 14 may be adhered to the panel 12 during the floatation panel manufacturing process. Alternatively, adhesive may be used to attach the fabric layer 14 to the floatation panel 12. The adhesive is beneficially selected and applied in a manner that is not detrimental to the gas diffusion and liquid transport properties of the floatation panels 12. For example, the adhesive may be applied in a discontinuous pattern. The adhesive can be any suitable weather resistant adhesive. Advantageously, a cross-linked polyurethane adhesive can be employed. The adhesive is further advantageously applied in an amount sufficient to prevent adhesive failure between the fabric layer 14 and the floatation panel 12.

As shown in FIG. 3, to aid in installation, an overhang 34 formed from a narrow strip of fabric layer may be provided before the foremost row of floatation panels 12. Ropes 36 are attached to the overhang so that the cover 10 can be pulled into place. Removable floats 38 may further be placed under the overhang to facilitate the installation process. The cover 10 may then be pulled into place over the surface of the reservoir 23 using one or more tractors or the like. To secure the reservoir cover 10 into place, its outermost circumference may be secured in an anchor provided around the perimeter of the reservoir 23. In aspects of the invention directed to ponds or lakes, the anchor is typically a trench. Exemplary anchors employed in conjunction with other aspects of the invention, e.g. tanks and the like, include any suitable fasteners, such as bolts and the like.

Figure 4A:
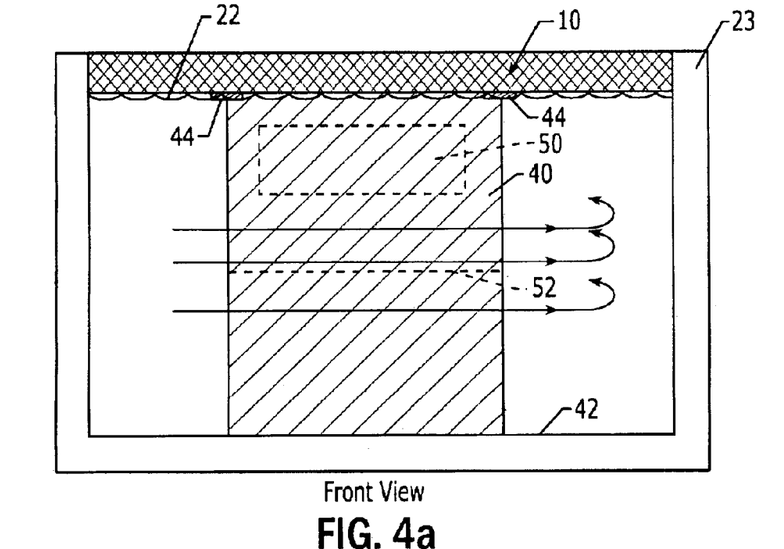
FIG. 4 illustrates a schematic view of a reservoir cover of the present invention attached to a floating baffle.
Figure 4B:
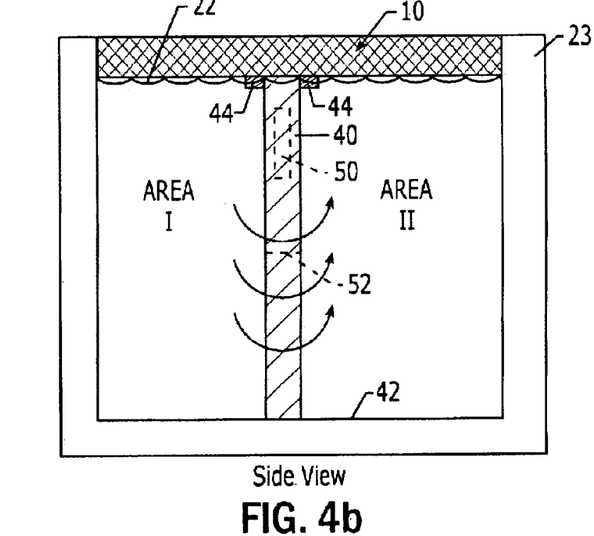

As shown in FIG. 4, in beneficial aspects of the invention the reservoir cover 10 may further be secured to one or more floating baffles 40. The floating baffles 40 may be used to separate the reservoir 42 into two or more separate water storage areas, indicated as AREA I and AREA II in FIG. 4B. The floating baffles may further be arranged so as to induce a serpentine flow pattern within the reservoir water. An exemplary serpentine effect induced by floating baffles is indicated by the arrows in FIG. 4B, illustrating reservoir water 22 flowing from Area I to Area II. Serpentine flow patterns within the reservoir water extend the retention time with the reservoir, promoting the settling of any solids suspended within the reservoir water.

As further shown in FIG. 4, the floating baffles 40 extend substantially vertically down into the depths of the reservoir water 22. The floating baffles advantageously extend to approximately the bottom of the reservoir 42, or within several inches thereof. Although the reservoir 23 depicted in FIG. 4 is a tank-type reservoir, floating baffles 40 may be used in conjunction with any type of reservoir.

The baffles 40 may be formed from any suitable construction and material known in the art. In advantageous embodiments, the floating baffles 40 include a foam float 30 sealed within a pocket provided in the uppermost region of the baffle 40. As used herein, the term "uppermost region" refers to the portion of the baffle 40 between the baffle midpoint (indicated by the dotted line 52) and the surface of the water 22 within the reservoir 23.

The floating baffles 40 may have any suitable thickness known in the art, such as a thickness ranging from about 15 to 60 mils, preferably from about 20 to 40 mils, such as a thickness of about 30 mil. Floating baffles suitable for use in the invention are commercially available. For example, floating baffles are commercially available from Seaman Corporation of Ohio, under the general product line XR, such as XR-3PM™ (NSF 61 approved for potable water) and XR-5™ baffles.

The floating baffles 40 may be attached 44 to the bottom of the reservoir cover by any means known in the art, including mechanical means, such as bolts and the like. The floating baffles 40 may be attached at any point along the width or length of the reservoir cover 10. In the embodiment provided in FIG. 4, the floating baffle 40 is attached at approximately the middle of the width and length of the reservoir cover 10. In alternative embodiments, the floating baffle 40 may be secured to one or more edges of the reservoir cover 10 extending over the reservoir water 22.

The reservoir covers of the present invention can retard the growth and sustenance of biomass by blocking an effective amount of amount of the sunlight impinging on the cover from entering the reservoir water. Preferably, the reservoir covers block at least about 95% of any impinging light. Considered differently, the reservoir covers advantageously transmit only about 5% or less of the light impinging on their surface, such as a transmission of about 1% or less. The reservoir covers of the invention further provide adequate liquid transport properties to drain rainwater from the surface of the cover into the reservoir, thereby avoiding inundation. Further, the reservoir covers of the present invention provide long life expectancies, are UV resistant, impervious to most chemicals, retain their properties in temperatures ranging from about −50° C. to about 55° C. and provide beneficial insulating properties which can assist in the treatment of process water.

Surprisingly, although sufficiently dense to preferably block substantially all, e.g. 95% or more, of the light impinging on their surface, the reservoir covers of the invention nevertheless provide a sufficient amount of liquid transport to allow rainwater to readily pass through their thickness. Although not wishing to be bound by theory, Applicants hypothesize that foam based floatation panels having a particular range of buoyancies may be used to form reservoir covers exhibiting a heretofore unknown balance of properties. More specifically, the buoyancy range of the invention has been found sufficient to both block an effective amount of sunlight from passing through the reservoir cover and allow rain to be readily transported through.

The following non-limiting examples serve to further illustrate the invention.

EXAMPLES

The opacity, immersion density and buoyancy were determined for six floatation panel samples formed in accordance with the invention. These properties were measured by an independent testing laboratory, Steve Nazar and Associates of Toronto, Canada.

Six floatation panels, two samples each from three production lots, having an average thickness of about 20 mm, were formed from closed cell polyethylene particles having an average diameter of about 0.5 in. The floatation panels were bonded using heated air provided through parallel platens as described above. The floatation panels tested were formed from particulate foam alone, and did not include any optional fabric layers. The floatation panels were further formed entirely from recycled, crosslinked closed-cell polyethylene foam.

Figure 5:
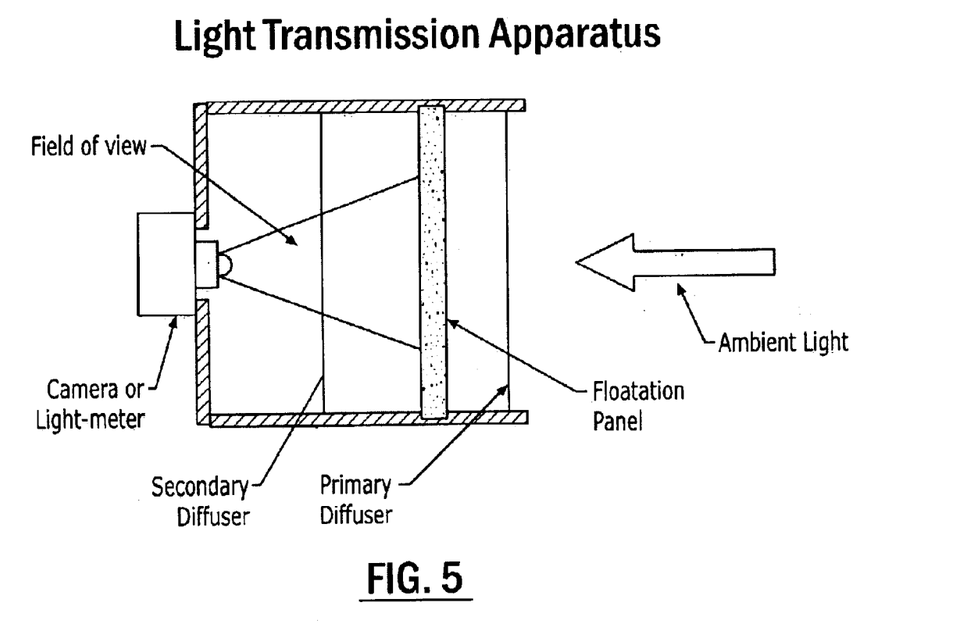
FIG. 5 illustrates a schematic view of an apparatus used to measure the light transmittance of floatation panels in accordance with the invention.

The opacity (or light transmission) for the samples was determined by measuring the proportion of light transmitted through a sample of floatation panel using a photographic light meter. FIG. 5 schematically illustrates one suitable apparatus for measuring light transmittance. The sample was placed between two sheets of light-diffusing onion-skin drafting paper and mounted into a box for testing. The box was arranged so that the field of view of a camera or light meter was entirely filled by the secondary (inner) diffuser, and no light reached the light meter except through the inner diffuser.

With no foam sample mounted, the outer primary diffuser (and through it, the inner diffuser) was initially illuminated with a white light source, i.e. sunlight. The camera was then set for average-field metering, not spot metering or center-weighted metering. The focus was at 0.3 meters, and the close length was at maximum wide angle. The exposure variance was 0. The film resolution was 2048 ×1536 pixels, with "fine" (minimum) JPEG compression. The color balance was "outdoor."

The correct exposure was set on the camera, viewing the inner diffuser at an aperture of F 2.0 and film-speed of 100 ISO. The shutter speed required to achieve correct exposure at this F-setting and film-speed was recorded.

With no changes to the illumination, camera F-settings, or film-speed, a sample was inserted between the diffusers. The foam board sample was larger than the aperture between the two diffusers so that it fully controlled the light passing through. The shutter speed required to achieve the correct exposure was determined with the sample in place and recorded.

The proportion of light passing through the sample was computed as: shutter time with the sample in the light path divided by the shutter time with no sample in the light path. For example, if the correct exposure time with no board inserted was 1/200 second, and the correct exposure time changes to 1/10 second when a board was inserted, then the proportion of light transmitted is 1/200 divided by 1/10=1/20 or 5%.

A small spot of constant illumination was moved over the view field and the metered exposure did not change, indicating that the light metering was an average over the view field. As an alternative check of the light metering, the view of a board was deliberately put out of focus, spreading the few small points of transmitted light over spots of at least 50-fold greater area. However, this change in focus did not change the metered exposure.

The light through primary diffuser and board was measured in alternation with measurements of the primary diffuser with no board in place. The transmittance was expressed as the difference between the two exposure times, in percent opacity, where 100% opacity would mean no light transmitted at all.

The volume buoyancy of each of the samples was then measured in accordance with ASTM D3575, Suffix AA. The specimens were immersed for 24 hours at 19° C., about 2 inches deep, before the buoyant force was measured using a SETRA balance (5 kg full scale, resolution 0.05 g). There were minor differences in the apparatus geometry (horizontal prongs substituted for a basket), but the only substantial exception made to the method was the use of two specimens per production lot, rather than three. As shown in Table 1, the volume buoyancy was calculated on a per unit displacement volume and per unit bulk volume, per ASTM D3575 Suffix AA Section 55.1. The area buoyancy was also determined on a per square foot basis, also shown in Table 1. The density was computed from the displaced volume buoyancy, as dry mass per unit displacement volume.

TABLE 1

Properties of Exemplary Floatation Panels

| Sample ID | Shutter Speed[1] (sec) | Buoyancy | | | Density $lb/ft^3$ |
| | | Area $lb/ft^2$ | Bulk Volume $lb/ft^3$ | Displaced Volume $lb/ft^3$ | |
| --- | --- | --- | --- | --- | --- |
| Example 1 | 8 | 3.73 | 42.5 | 52.4 | 12.4 |
| Example 2 | 8 | 3.45 | 44.9 | 52.7 | 12.1 |
| Example 3 | 8 | 3.08 | 49.0 | 50.3 | 15.0 |
| Example 4 | 8 | 3.56 | 43.7 | 52.4 | 12.4 |
| Example 5 | 8 | 3.54 | 43.3 | 52.2 | 12.6 |
| Example 6 | 8 | 2.93 | 41.5 | 50.3 | 15.1 |

[1]All measurements of light through the primary diffuser, without board in place, were 1/1000 second, which was the camera's fastest shutter speed. All measurements of light through any board plus the diffuser were 8 seconds, which was the camera's slowest shutter speed.

As shown in Table 1, floatation panels formed in accordance with the invention produce shutter speeds of 8 seconds, indicating opacities of greater than 7999 parts in 8000, or greater than 99.988%. Floatation panels formed in accordance with the invention further exhibit densities of about 12 $lb/ft^3$ or greater, area buoyancies of about 2.9 $lb/ft^2$ or higher and volume buoyancies of about 40 $lb/ft^3$ or higher.

That which is claimed:

1. A water reservoir system comprising:
   a water reservoir containing potable or process water; and
   a water reservoir cover spanning at least a portion of the surface of said water reservoir, said water reservoir cover comprising
      at least two floatation panels, said floatation panels each comprising
      a plurality of polymeric foam particles arranged in a piled laminate structure;
      at least a portion of said polymeric foam particles within said piled laminate structure
      bonded to at least one adjoining foam particle positioned either above or below said foam particle;
         said piled laminate structure further defining a first face and opposing second face, said first face contacting said water reservoir at or near its surface;
         wherein at least a portion of said foam particles exhibit sufficient buoyancy to collectively float said floatation panel in said water reservoir, said foam particles further arranged within said piled laminate structure so as to define interstices between at least a portion of said foam particles, said interstices of sufficient size and quantity to allow rainwater to flow through said piled laminate structure while further providing a light transmittance of less than about 95%; and
      a fabric layer bonded to at least a portion of said second face, said fabric layer defining an overhang extending beyond the perimeter of at least a portion of said piled laminate structure;

said at least two adjacent floatation panels joined into a single unit by bonding said overhang of two or more adjacent floatation panels.

2. The water reservoir system of claim 1, wherein said interstices are of sufficient size and quantity to allow rainwater to flow through while further providing a light transmittance of less than about 5%.

3. The water reservoir system of claim 1, wherein said floatation panel provides a light transmittance of less than about 1%.

4. The water reservoir system of claim 1, wherein each of said floatation panel exhibits volume buoyancy ranging from about 40 to 60 lb/ft$^3$.

5. The water reservoir system of claim 1, wherein said polymeric foam particles are formed from one or more polymers selected from polyolefin, polyvinyl acetate, and polyurethane.

6. The water reservoir system of claim 5, wherein said polyolefin is selected from the group consisting of polyethylene, polypropylene and mixtures thereof.

7. The water reservoir system of claim 1, wherein said polymeric foam particles are bonded by means selected from thermal bonding, needlepunching, stitching and chemically binding.

8. The water reservoir system of claim 7, wherein said polymeric foam particles are thermally bonded.

9. The water reservoir system of claim 7, wherein said polymeric foam particles are bonded by needlepunching.

10. The water reservoir system of claim 7, wherein said polymeric foam particles are bonded by chemically binding.

11. The water reservoir system of claim 1, wherein said polymeric foam particles have a diameter in the range of from about 0.25 to 3.0 inches.

12. The water reservoir system of claim 1, wherein the thickness between said first and second face ranges from about 7 to 250 mm.

13. The water reservoir system of claim 1, wherein said fabric layer is formed from a fiber having a denier ranging from about 3 to 45.

14. The water reservoir system of claim 1, wherein said fabric layer is formed from one or more fibers selected from polyester, nylon, glass, acrylic, flax, and polyolefin.

15. The water reservoir system of claim 14, wherein said fabric layer is formed from polyester.

16. The water reservoir system of claim 1, wherein said fabric layer is a nonwoven fabric.

17. The water reservoir system of claim 1, wherein said fabric layer exhibits a fabric weight ranging from about 5 oz/yd$^2$ to 35 oz/yd$^2$.

18. The water reservoir system of claim 1, further comprising a fabric bonded to at least a portion of said first face.

19. The water reservoir system of claim 18, wherein said fabric bonded to said first face is selected from the group consisting of woven, nonwoven, knit and net fabric.

20. The water reservoir system of claim 19, wherein said fabric is a spunbond nonwoven.

21. A water reservoir according to claim 1, wherein said water reservoir system further includes an anchor to secure said water reservoir cover around the perimeter of said water reservoir.

22. A water reservoir system according to claim 1, wherein said water reservoir system further includes at least one baffle secured to said water reservoir cover, said baffle extending substantially vertically down into the depths of the reservoir water and forming two or more separate water storage areas within the reservoir.

23. A water reservoir according to claim 1, wherein said at least one baffle is secured to an edge of said water reservoir cover extending over said water reservoir.

24. A water reservoir system according to claim 1, wherein at least two baffles are secured to said water reservoir cover, said baffles arranged so as to induce a serpentine flow pattern within the potable or process water.

25. A method of supplying potable or process water comprising:
(a) supplying potable or process water to a reservoir;
(b) covering the surface of the reservoir with a water reservoir cover comprising
   (i) at least two floatation panels, each of said floatation panels comprising
      a plurality of polymeric foam particles arranged in a piled laminate structure;
      at least a portion of the polymeric foam particles within the piled laminate structure bonded to at least one adjoining foam particle positioned either above or below the foam particle;
      the piled laminate structure further defining a first face and opposing second face, the first face contacting the water reservoir at or near its surface;
      wherein at least a portion of the foam particles exhibit sufficient buoyancy to collectively float the floatation panel in the waste material confinement area, the foam particles further arranged within the piled laminate structure so as to define interstices between at least a portion of the foam particles, the interstices of sufficient size and quantity to allow rainwater to flow through the piled laminate structure and further provide a light transmittance of less than about 95%; and
   (ii) a fabric layer bonded to at least a portion of the second faces of the at least two floatation panels to join the at least two of floatation panels into a single unit;
(c) providing an anchor around the perimeter of the reservoir; and
(d) securing said reservoir cover with said anchor.

26. The method of supplying water of claim 25, wherein said interstices are of sufficient size and quantity to allow rainwater to flow through said piled laminate structure while further providing a light transmittance of less than about 5%.

27. The method of supplying water of claim 25, wherein each of said floatation panel exhibits a volume buoyancy ranging from about 40 to 60 lb/ft$^3$.

28. The method of supplying water of claim 25, wherein said fabric layer is formed from one or more fibers selected from polyester, nylon, glass fiber, acrylic, flax, and polyolefin.

29. The method of supplying water of claim 28, wherein said fabric layer is formed from polyester and acrylic fiber.

30. The method of supplying water of claim 25, wherein said polymeric foam particles are formed from one or more polymers selected from polyolefin, ethylene vinyl acetate and polyurethane.

31. The method of supplying water of claim 30, wherein said polyolefin is selected from the group consisting of polyethylene, polypropylene and mixtures thereof.

32. The method of supplying water of claim 25, wherein said polymeric foam particles are formed from closed cell foam.

33. The method of supplying water of claim 25, wherein said polymeric foam particles are bonded by at least one means selected from thermal bonding, needlepunching, stitching and chemically binding.

34. The method of supplying water of claim 33, wherein said polymeric foam particles are thermally bonded.

35. The method of supplying water of claim 33, wherein said polymeric foam particles are bonded by needlepunching.

36. The method of supplying water of claim 33, wherein said polymeric foam particles are bonded by chemically binding.

* * * * *